US012560567B2

(12) United States Patent
Moon et al.

(10) Patent No.: US 12,560,567 B2
(45) Date of Patent: Feb. 24, 2026

(54) MEMS GAS SENSOR AND MANUFACTURING METHOD THEREOF

(71) Applicant: ELECTRONICS AND TELECOMMUNICATIONS RESEARCH INSTITUTE, Daejeon (KR)

(72) Inventors: Seungeon Moon, Daejeon (KR); Jeong Hun Kim, Daejeon (KR); Jong Pil Im, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 175 days.

(21) Appl. No.: 18/464,772

(22) Filed: Sep. 11, 2023

(65) Prior Publication Data

US 2024/0110883 A1      Apr. 4, 2024

(30) Foreign Application Priority Data

Sep. 29, 2022    (KR) ........................ 10-2022-0124645
Jan. 16, 2023    (KR) ........................ 10-2023-0006006

(51) Int. Cl.
*G01N 27/12*          (2006.01)

(52) U.S. Cl.
CPC .................................. *G01N 27/125* (2013.01)

(58) Field of Classification Search
CPC ................ G01R 33/00; G01R 33/0035; G01R 33/0023; G01R 33/0017; G01R 31/3191; G01R 33/0358; G01R 33/0356; G01R 33/0206; G01R 33/0082; G01R 33/022; G01N 27/125; G01B 7/004; G01C 17/38; G06F 3/017; G06F 3/0346; G06F 3/012; H01L 39/223
See application file for complete search history.

(56) References Cited

U.S. PATENT DOCUMENTS

| 9,746,437 | B1 * | 8/2017 | Chiou | ................ | H10D 84/0135 |
| 9,853,201 | B2 | 12/2017 | Grosh et al. | | |
| 2010/0147684 | A1 | 6/2010 | Park et al. | | |
| 2016/0061761 | A1 * | 3/2016 | Shim | .................... | G01N 27/122 |
| | | | | | 436/151 |
| 2017/0045473 | A1 | 2/2017 | Yu et al. | | |
| 2022/0128498 | A1 * | 4/2022 | Moon | .................... | G01N 25/30 |

FOREIGN PATENT DOCUMENTS

| KR | 10-2011-0025697 A | 3/2011 |
| KR | 10-2012-0091981 A | 8/2012 |
| KR | 10-1349267 B1 | 1/2014 |
| KR | 10-2014-0084583 A | 7/2014 |
| KR | 10-2019-0016424 A | 2/2019 |

* cited by examiner

*Primary Examiner* — Lee E Rodak
*Assistant Examiner* — Taqi R Nasir

(57) ABSTRACT

Disclosed are a MEMS gas sensor and a manufacturing method thereof. The MEMS gas sensor includes a substrate having a recess, a membrane disposed in the recess and having a through-hole configured to expose a portion of a top surface of the substrate, which is disposed at a central portion of the recess, sensing electrodes disposed in the membrane, and a sensing layer disposed on each of bottom and top surfaces of the membrane and disposed in the through-hole.

13 Claims, 4 Drawing Sheets

MEMS GAS SENSOR AND MANUFACTURING METHOD THEREOF

CROSS-REFERENCE TO RELATED APPLICATIONS

This U.S. non-provisional patent application claims priority under 35 U.S.C. § 119 of Korean Patent Application Nos. 10-2022-0124645, filed on Sep. 29, 2022, and 10-2023-0006006, filed on Jan. 16, 2023, the entire contents of which are hereby incorporated by reference.

BACKGROUND

The present disclosure relates to a gas sensor and a manufacturing method thereof, and more particularly, to a MEMS gas sensor and a manufacturing method thereof.

A semiconductor-type gas sensor that is most frequently used among various gas sensors uses metal oxide powder deposited generally by a method such as screen printing as a sensing material. The semiconductor-type gas sensor operates based on a gas sensing principle having a main factor that is a chemical reaction such as electron exchange between the deposited gas sensing material and a target gas. This reaction generally occurs at a high temperature of 200° C. to 500° C. A typical bulk-type gas sensor is heated by a metal thick film heater such as alumina disposed behind a substrate to an operation temperature and thus exhibits a power consumption of several hundred mW. When compared with a physical sensor such as an acceleration or temperature sensor or a chemical sensor such as a humidity sensor, the above-described gas sensor having a high power consumption characteristic is difficult to be mounted to a product for various services in the IoT or wearable era. Thus, various researches on the MEMS gas sensor have been conducted as a next-generation gas sensor because the MEMS gas sensor may reduce power consumption to less than $1/10$ by applying partial heating and heat loss minimization structure while reducing a size of a heater by using the MEMS technology, be driven by low power while having an ultra-small size in comparison with the typical bulk-type gas sensor, and be mass-produced through a CMOS-compatible MEMS process.

Particularly, the MEMS gas sensor has a low-power driving characteristic by using a partial heating method that uses air as an insulator by etching a substrate of a heating resistor portion while minimizing a size of the heater instead of using an entire substrate heating method of the typical bulk-type gas sensor.

SUMMARY

The present disclosure provides a MEMS gas sensor capable of fixing a sensing layer to a membrane.

An embodiment of the inventive concept provides a MEMS gas sensor. The MEMS gas sensor includes: a substrate having a recess; a membrane disposed in the recess and having a through-hole configured to expose a portion of a top surface of the substrate, which is disposed at a central portion of the recess; sensing electrodes disposed in the membrane; and a sensing layer disposed on each of bottom and top surfaces of the membrane and disposed in the through-hole.

In an embodiment, the sensing layer may include: a lower sensing layer disposed on the bottom surface of the membrane; and an upper sensing layer disposed on the top surface of the membrane.

In an embodiment, the sensing layer may further include a middle sensing layer disposed in the through-hole and configured to connect the lower sensing layer to the upper sensing layer.

In an embodiment, the middle sensing layer may have a width less than that of each of the upper sensing layer and the lower sensing layer.

In an embodiment, the upper sensing layer may be aligned to the lower sensing layer.

In an embodiment, the sensing layer may have an I-shape.

In an embodiment, the membrane may include: a lower insulation layer; a supporting layer disposed on the lower insulation layer; and a middle insulation layer disposed on the supporting layer In an embodiment, the heater layer is disposed on the middle insulation layer.

In an embodiment, the membrane may further include an upper insulation layer disposed on the middle insulation layer and the heater layer.

In an embodiment, the upper insulation layer may includes: a first upper insulation layer; and a second upper insulation layer disposed on the first upper insulation layer.

In an embodiment of the inventive concept, a method for manufacturing a MEMS gas sensor includes: forming a lower insulation layer, a supporting layer, and a middle insulation layer; forming a heater layer on the middle insulation layer; forming a first upper insulation layer on the heater layer and the middle insulation layer; forming sensing electrodes on the first upper insulation layer; forming a second upper insulation layer on the first upper insulation layer at the outside of the sensing electrodes; forming a preliminary recess and a through-hole by removing a portion of each of the first and second upper insulation layers, the middle insulation layer, the supporting layer, the lower insulation layer, and the substrate between the outside of the sensing electrodes and the sensing electrodes; forming a sensing layer in the through-hole between the sensing electrodes; and forming a recess by additionally removing a portion of the substrate below the sensing layer.

In an embodiment, the sensing layer may be formed by a dropping method or a printing method.

In an embodiment, the sensing layer may have an I-shape.

In an embodiment, the recess may be formed by performing an isotropic etching process on the substrate.

In an embodiment, the isotropic etching process may use an $XeF_2$ gas.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
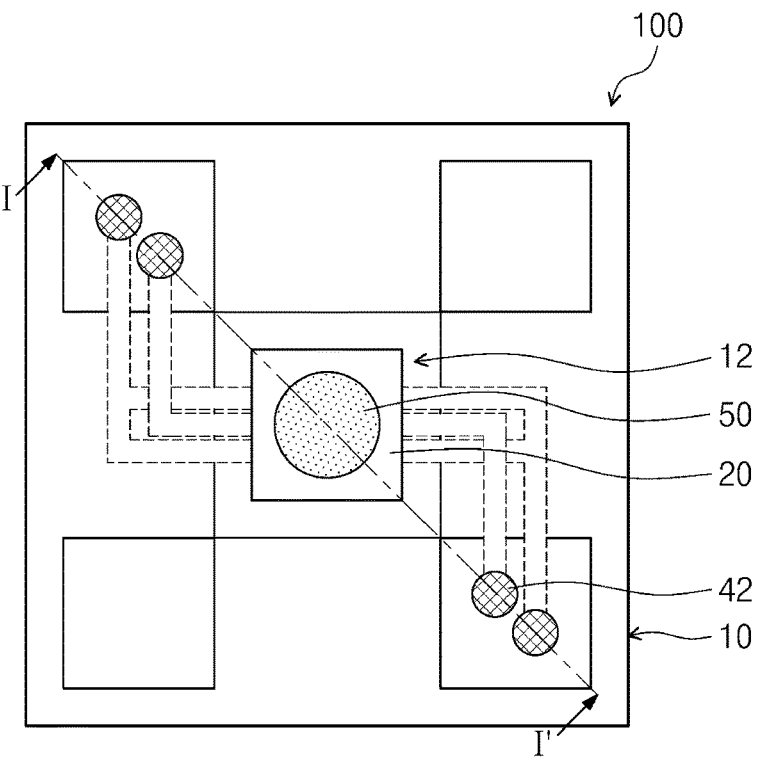
FIG. 1 is a plan view illustrating an example of a MEMS gas sensor according to an embodiment of the inventive concept.

Hereinafter, preferred embodiments of the inventive concept will be described in detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

In the following description, the technical terms are used only for explaining a specific exemplary embodiment while not limiting the present disclosure. In the specification, the terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components. Since preferred embodiments are provided below, the order of the reference numerals given in the description is not limited thereto.

Additionally, the embodiment in the detailed description will be described with sectional views as ideal exemplary views of the present invention. Also, in the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes.

Figure 2:
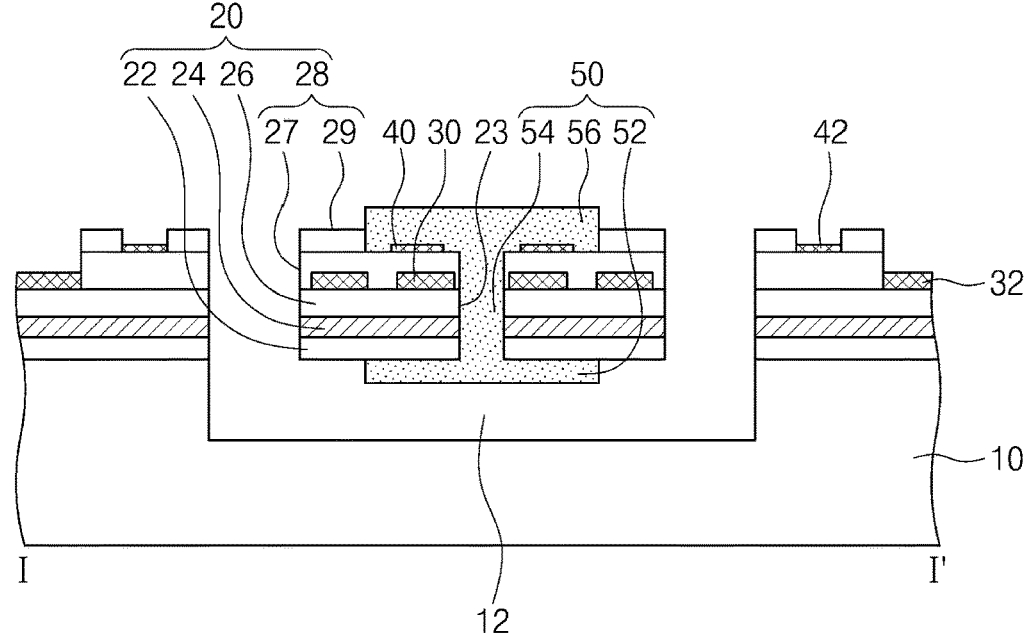
FIG. 2 is a cross-sectional view taken along line I-I' of FIG. 1.

FIG. 1 is a view illustrating an example of a micro electro mechanical systems (MEMS) gas sensor 100 according to an embodiment of the inventive concept. FIG. 2 is a cross-sectional view taken along line I-I' of FIG. 1.

Referring to FIGS. 1 and 2, the MEMS gas sensor 100 according to an embodiment of the inventive concept may be a low-power consumption MEMS gas sensor or a low-power semiconductor heater. According to an embodiment of the inventive concept, the MEMS gas sensor 100 may include a substrate 10, a membrane 20, a heater layer 30, sensing electrodes 40, and a sensing layer 50.

The substrate 10 may be disposed below the membrane layer 20. For example, the substrate 10 may be a silicone substrate. Alternatively, the substrate 10 may include aluminum oxide ($Al_2O_3$), magnesium oxide (MgO), quartz, gallium-nitrogen (GaN), or gallium-arsenic (GaAs). Alternatively, the substrate 10 may include a flexible substrate made of polycarbonate (PC), polyethylene terephthalate (PET), polyethersulfone (PES), polyethylene naphthalate (PEN), or polyimide (PI). According to an embodiment, the substrate 10 may include a recess 12 or a trench. The recess 12 may be defined at a center of the substrate 10. The recess 12 may have an inner bottom spaced apart from the membrane 20.

The membrane 20 may be disposed on the substrate 10. The membrane may be supported by an edge of the substrate 10. The membrane 20 may be disposed at an upper portion of the recess 12 of the substrate 10. The membrane 20 may vibrate and/or move above and below the recess 12. Accordinging to an embodiment, the membrane 20 may include a lower insulation layer 22, a supporting layer 24, a middle insulation layer 26, and an upper insulation layer 28.

The lower insulation layer 22 may be disposed at the upper portion of the recess 12. The lower insulation layer 22 may be disposed on the substrate 10 outside the membrane 20. The lower insulation layer 22 may include a dielectric material such as silicon oxide, silicon nitride, or metal oxide. Alternatively, the lower insulation layer 22 may include a polymer. However, the embodiment of the inventive concept is not limited thereto.

The supporting layer 24 may be disposed on the lower insulation layer 22. The supporting layer 24 may include an elastic layer or a plastic layer.

The middle insulation layer 26 may be disposed on the supporting layer 24. The middle insulation layer 26 may be made of the same material as the lower insulation layer 22. The middle insulation layer 26 may include a dielectric material such as silicon oxide, silicon nitride, or metal oxide.

The upper insulation layer 28 may be disposed on the middle insulation layer 26 and a heater layer 30. The upper insulation layer 28 may be made of the same material as the lower insulation layer 22 and the middle insulation layer 26. The upper insulation layer 28 may include a dielectric material such as silicon oxide, silicon nitride, or metal oxide.

According to an embodiment, the membrane 20 may have a through-hole 23. The through-hole 23 may be defined in a central area of in the membrane 20. Although not shown, the through-hole 23 may expose a portion of the substrate 10 that is the bottom of the recess 12.

The heater layer 30 may be disposed between the middle insulation layer 26 and a first upper insulation layer 27, which are disposed around the through-hole 23. The heater layer 30 may include an alloy of chromium (Cr) and nickel (Ni). Alternatively, the heater layer 30 may include a metal such as tungsten (W), platinum (Pt), or palladium (Pd), silicone, or conductive metal oxide. The heater layer 30 may include heater pads 32 disposed outside the membrane 20. The heater pads 32 may provide heating power into the heater layer 30. The heater layer 30 may heat the sensing layer 50.

Sensing electrodes 40 may be disposed between the first upper insulation layer 27 and the sensing layer 50, which are disposed around the through-hole 23. Each of the sensing electrodes 40 may include gold (Au), silver (Ag), copper (Cu), or aluminum (Al). Each of the sensing electrodes 40 may include electrode pads 42. The sensing electrodes 42 may be disposed on the substrate 10 outside the membrane 20. The sensing electrodes 40 may provide an electric field to the sensing layer 50 to measure resistance of the sensing layer 50. When the resistance of the sensing layer 50 is varied, a control unit may determine whether a gas exists based on the varied resistance.

The sensing layer 50 may be disposed on the sensing electrodes 40. The sensing layer 50 may be disposed between the substrate 10 disposed at the bottom of the recess 12 and the membrane 20. The sensing layer 50 may contact a bottom surface of the membrane 20. The sensing layer 50 may be disposed in the through-hole 23 and fixed to the membrane 20 to increase operational stability of the MEMS gas sensor 100. The sensing layer 50 may detect and/or adsorb harmful gases (e.g., solvents and polar gases) in the air. For example, the sensing layer 50 may include metal oxide, polymer or a biomaterial. The sensing layer 50 may have a I-shape. According to an embodiment, the sensing layer 50 may include a lower sensing layer 52, a middle sensing layer 54, and an upper sensing layer 56.

The lower sensing layer 52 may be disposed on a lower surface or a bottom surface of the membrane 20. The lower sensing layer 52 may be disposed in the recess 12. The lower sensing layer 52 may increase a surface area of the sensing layer 50. The lower sensing layer 52 may be disposed between the substrate 10 disposed at the bottom of the recess 12 and the membrane 20. The lower sensing layer 52 may have a width less than that of the membrane 20. The lower sensing layer 52 may be connected to the middle sensing layer 54 and the upper sensing layer 56. The lower sensing layer 52 may fix the middle sensing layer 54 and the upper sensing layer 56 to the membrane 20.

The middle sensing layer 54 may be disposed between the lower sensing layer 52 and the upper sensing layer 56. The middle sensing layer 54 may be disposed in the through-hole 23 of the membrane 20. The middle sensing layer 54 may have a width less than each of the lower sensing layer 52 and the upper sensing layer 56 in a vertical perspective. The middle sensing layer 54 may fix the lower sensing layer 52 and the upper sensing layer 56 to a bottom surface and a top surface of the membrane 20, respectively. The middle sensing layer 54 may increase adhesive force between the lower sensing layer 52 and the upper sensing layer 56 to increase the operational stability of the MEMS gas sensor 100.

The upper sensing layer 56 may be disposed on the top surface of the membrane 20. The upper sensing layer 56 may be aligned onto the lower sensing layer 52. The upper sensing layer 56 may be disposed on the middle sensing layer 54. The upper sensing layer 56 may be fixed to the membrane 20 by the lower sensing layer 52 and the middle sensing layer 54.

A method for manufacturing the MEMS gas sensor 100 having the above-described configuration according to an embodiment of the inventive concept will be described as follows.

Figure 3:
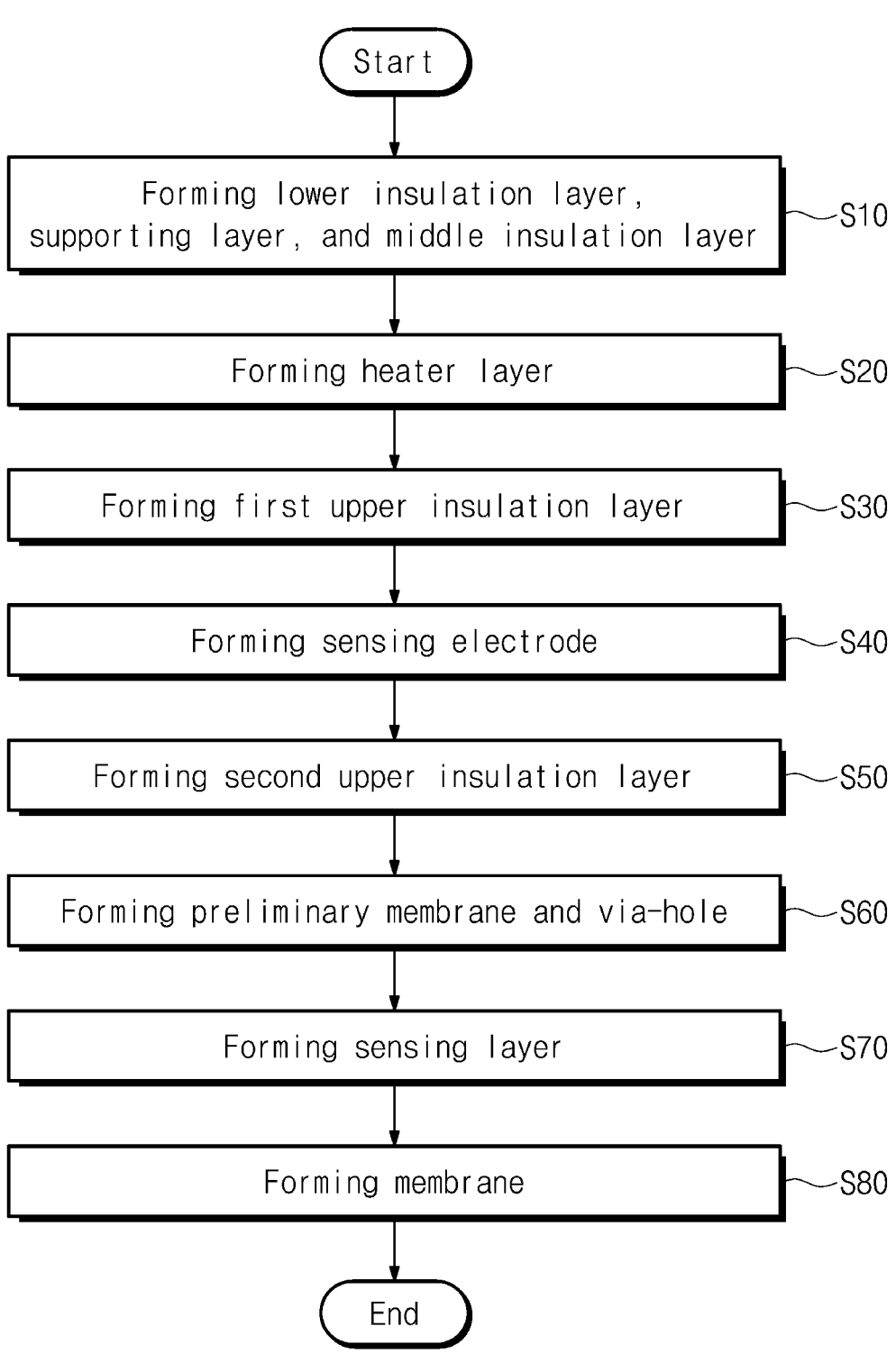
FIG. 3 is a flowchart representing a method for manufacturing a MEMS gas sensor according to an embodiment of the inventive concept.

FIG. 3 is a flowchart representing the method for manufacturing the MEMS gas sensor 100 according to an embodiment of the inventive concept. FIGS. 4 to 7 are cross-sectional views illustrating operations of the method for manufacturing the MEMS gas sensor 100 according to an embodiment of the inventive concept.

Figure 4:
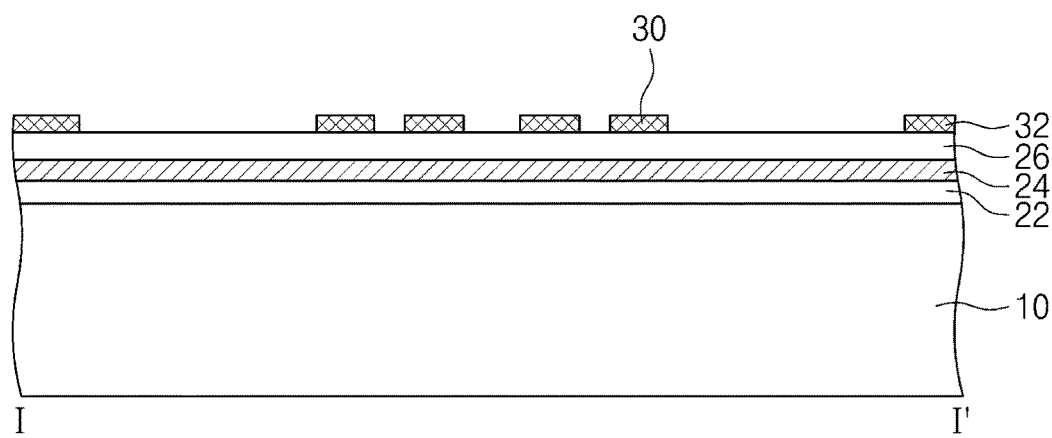
FIG. 4, FIG. 5, FIG. 6, and FIG. 7 are cross-sectional views illustrating processes of the method for manufacturing the MEMS gas sensor according to an embodiment of the inventive concept.

Referring to FIGS. 3 and 4, a lower insulation layer 22, a supporting layer 24, and a middle insulation layer 26 are laminated. The lower insulation layer 22, the supporting layer 24, and the middle insulation layer 26 may be formed by a physical vapor deposition (PVD) method or a chemical vapor deposition (CVD) method. Alternatively, the lower insulation layer 22, the supporting layer 24, and the middle insulation layer 26 may be formed by a thermal oxidation deposition method, a spin coating method, or a sol-gel method. However, the embodiment of the inventive concept is not limited thereto.

Thereafter, a heater layer 30 is formed on the middle insulation layer 26 in an operation S20. The heater layer 30 may be formed by the PVD method such as a sputtering method. Alternatively, the heater layer 30 may be formed by an e-beam deposition method or an evaporation deposition method. The heater layer 30 may have an inter-digital shape or a gap shape.

Figure 5:
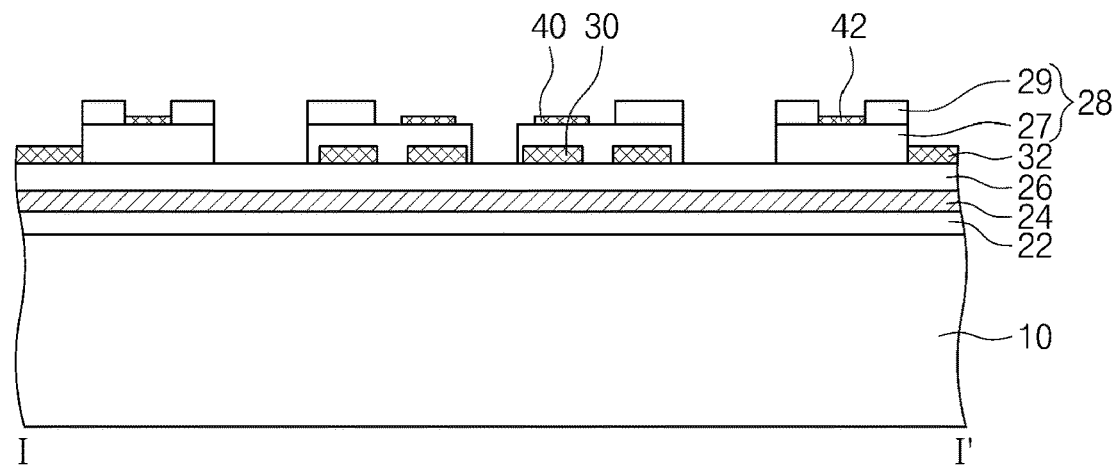

Referring to FIGS. 3 and 5, a first upper insulation layer 27 is formed on the heater layer 30 in an operation S30. The first upper insulation layer 27 may be formed by the PVD method or the CVD method.

Thereafter, sensing electrodes 40 are formed on the first upper insulation layer 27 in an operation S40. The sensing electrodes 40 may be formed through a metal layer deposition process, a lithography process, and an etching process.

Thereafter, a second upper insulation layer 29 is formed on the sensing electrodes 40 in an operation S50. The second upper insulation layer 29 may be formed by the PVD method or the CVD method. The heater pads 32 and the electrode pads 42 around the sensing electrodes 40 and the heater layer 30 may be exposed by removing a portion of the second upper insulating layer 29.

Figure 6:
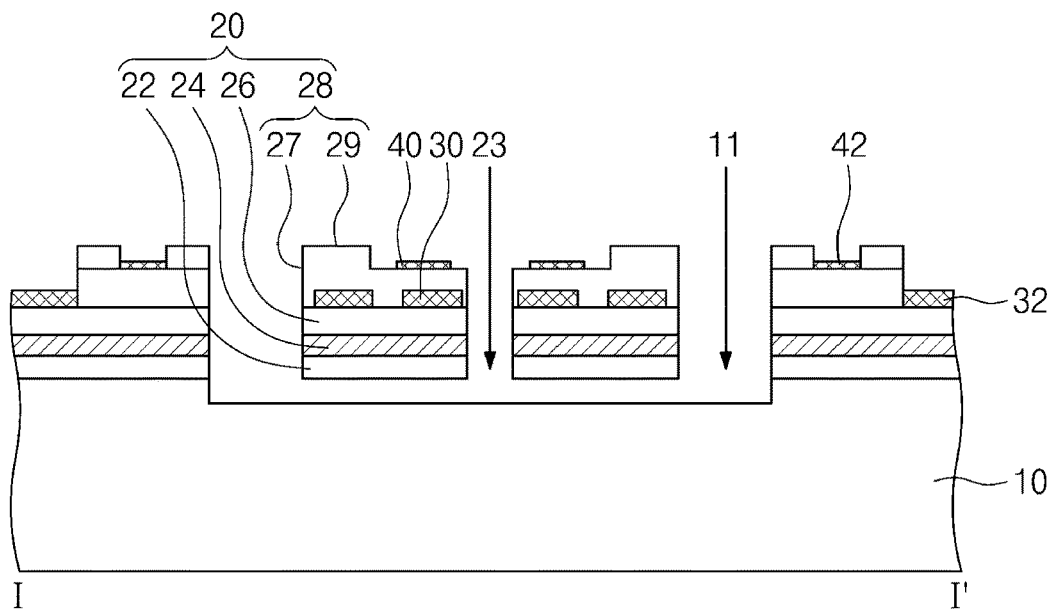

Referring to FIGS. 3 and 6, a preliminary recess 11 and a through-hole 23 are formed by removing a portion of each of the first upper insulation layer 27, the second upper insulation layer 29, the middle insulation layer 26, the supporting layer 24, and the substrate 10 around the sensing electrodes 40 and the heater layer 30 in an operation S60. The substrate 10 and the lower insulation layer 22 in the preliminary recess 11 may be separated from each other in a vertical perspective.

Figure 7:
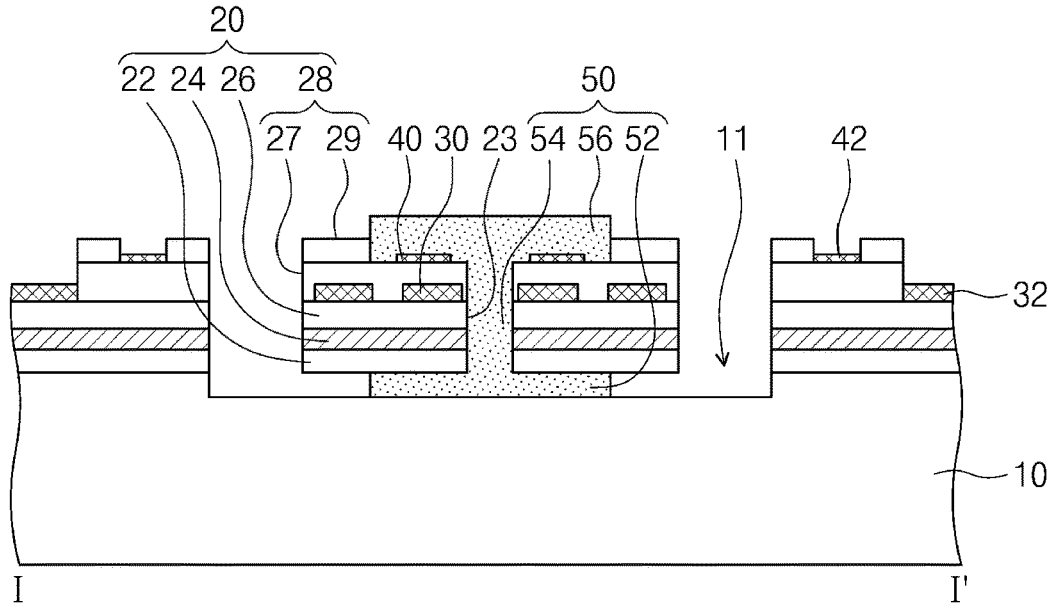

Referring to FIGS. 3 and 7, a sensing layer 50 is formed in the through-hole 23 in an operation S70. The sensing layer 50 may be formed by a dropping method or a printing method. The sensing layer 50 may be formed on each of a top surface and a bottom surface of the membrane 20. The sensing layer 50 may be cured or overheated by an annealing method. The sensing layer 50 may have a I-shape in a vertical perspective.

Referring to FIGS. 2 and 3, a recess 12 is formed by additionally removing a portion of the substrate 10 in the preliminary recess 11 in an operation S80. The recess 12 may be formed by performing an isotropic etching process on the substrate 10. The isotropic etching process may be performed by an etchant of $XeF_2$ gas. Alternatively, the isotropic etching process may include a wet etching process. However, the embodiment of the inventive concept is not limited thereto.

As described above, the MEMS gas sensor according to the embodiment of the inventive concept may form the sensing layer in the through-hole of the membrane to fix the sensing layer to the membrane.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A MEMS gas sensor comprising:
    a substrate having a recess;
    a membrane disposed in the recess and having a through-hole configured to expose a portion of a top surface of the substrate, the through-hole being disposed at a central portion of the recess;
    sensing electrodes disposed in the membrane; and
    a sensing layer disposed on both bottom and top surfaces of the membrane and within the through-hole,
    wherein the sensing layer comprises:
        a lower sensing layer disposed on the bottom surface of the membrane;
        an upper sensing layer disposed on the top surface of the membrane; and
        a middle sensing layer disposed in the through-hole and configured to connect the lower sensing layer to the upper sensing layer, the middle sensing layer extending from the lower sensing layer to the upper sensing layer and including a sensing material that is the same as that of the lower sensing layer and the upper sensing layer.

2. The MEMS gas sensor of claim 1, wherein the middle sensing layer has a width less than that of each of the upper sensing layer and the lower sensing layer.

3. The MEMS gas sensor of claim 1, wherein the upper sensing layer is aligned to the lower sensing layer.

4. The MEMS gas sensor of claim 1, wherein the sensing layer has an I-shape.

5. The MEMS gas sensor of claim 4, wherein the membrane comprises:

a lower insulation layer;

a supporting layer disposed on the lower insulation layer; and a middle insulation layer disposed on the supporting layer.

6. The MEMS gas sensor of claim 5, wherein the membrane further comprises a heater layer disposed on the middle insulation layer.

7. The MEMS gas sensor of claim 6, wherein the membrane further comprises an upper insulation layer disposed on the middle insulation layer and the heater layer.

8. The MEMS gas sensor of claim 7, wherein the upper insulation layer comprises:

a first upper insulation layer; and a second upper insulation layer disposed on the first upper insulation layer.

9. A method for manufacturing a MEMS gas sensor, the method comprising:

forming a lower insulation layer, a supporting layer, and a middle insulation layer;

forming a heater layer on the middle insulation layer;

forming a first upper insulation layer on the heater layer and the middle insulation layer;

forming sensing electrodes on the first upper insulation layer;

forming a second upper insulation layer on the first upper insulation layer at the outside of the sensing electrodes;

forming a preliminary recess and a through-hole by removing a portion of each of the first and second upper insulation layers, the middle insulation layer, the supporting layer, the lower insulation layer, and the substrate between the outside of the sensing electrodes and the sensing electrodes;

forming a sensing layer to fill the through-hole between the sensing electrodes; and forming a recess by additionally removing a portion of the substrate below the sensing layer, wherein the sensing layer comprises:

a lower sensing layer formed in the recess and disposed on a bottom surface of the lower insulation layer;

an upper sensing layer formed on the sensing electrodes and disposed on a top surface of the first upper insulation layer; and a middle sensing layer disposed in the through-hole and configured to connect the lower sensing layer to the upper sensing layer, the middle sensing layer extending from the lower sensing layer to the upper sensing layer and including a sensing material that is the same as that of the lower sensing layer and the upper sensing layer.

10. The method of claim 9, wherein the sensing layer is formed by a dropping method or a printing method.

11. The method of claim 9, wherein the sensing layer has an I-shape.

12. The method of claim 9, wherein the recess is formed by performing an isotropic etching process on the substrate.

13. The method of claim 12, wherein the isotropic etching process uses an $XeF_2$ gas.

* * * * *